(12) United States Patent
Jeong et al.

(10) Patent No.: US 12,703,431 B2
(45) Date of Patent: Aug. 11, 2026

(54) CONNECTION STRUCTURE OF VEHICLE BODY

(71) Applicants: Hyundai Motor Company, Seoul (KR); Kia Corporation, Seoul (KR)

(72) Inventors: Songjae Jeong, Seongnam-si (KR); Jaeha Shim, Goyang-si (KR); Bong Guen Kwon, Seoul (KR); Jae Hoon Jung, Pyeongtaek-si (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 357 days.

(21) Appl. No.: 18/467,110

(22) Filed: Sep. 14, 2023

(65) Prior Publication Data

US 2024/0166265 A1 May 23, 2024

(30) Foreign Application Priority Data

Nov. 22, 2022 (KR) ........................ 10-2022-0157322

(51) Int. Cl.
*B62D 25/06* (2006.01)
*B62D 27/02* (2006.01)
*B62D 27/06* (2006.01)

(52) U.S. Cl.
CPC ............. *B62D 25/06* (2013.01); *B62D 27/02* (2013.01); *B62D 27/065* (2013.01)

(58) Field of Classification Search
CPC ........ B62D 25/06; B62D 25/04; B62D 25/02; B62D 27/02; B62D 27/023; B62D 27/065
USPC .............. 296/210, 203.01, 3, 29, 30, 193.05
See application file for complete search history.

(56) References Cited

U.S. PATENT DOCUMENTS 5,332,277 A * 7/1994 Enning ................ B62D 25/081 296/203.02
5,634,663 A * 6/1997 Krupp .................... B62D 21/02 296/29
10,597,090 B2 * 3/2020 Son ...................... B62D 29/008

FOREIGN PATENT DOCUMENTS

JP 2010235014 A * 10/2010 ........... B62D 33/044

OTHER PUBLICATIONS

JP2010-235014 text (Year: 2010).*

* cited by examiner

*Primary Examiner* — Patricia L Engle
(74) *Attorney, Agent, or Firm* — Slater Matsil, LLP

(57) ABSTRACT

An embodiment connection structure of a vehicle body includes a side member disposed along a front to rear direction of the vehicle body on an upper portion of a side structure provided on a side of the vehicle body, the side member having a first closed cross-section, a roof rail member disposed along a vehicle width direction and having a second closed cross-section, and a joint member connected to the side member and the roof rail member to connect the side member and the roof rail member to each other.

20 Claims, 13 Drawing Sheets

100

CONNECTION STRUCTURE OF VEHICLE BODY

CROSS-REFERENCE TO RELATED APPLICATIONS

This application claims the benefit of Korean Patent Application No. 10-2022-0157322, filed on Nov. 22, 2022, which application is hereby incorporated herein by reference.

TECHNICAL FIELD

The present invention relates to a vehicle body structure.

BACKGROUND

In general, a closed cross-section structure is applied to a vehicle body to protect the occupant from a collision. Such a vehicle body may form a closed cross-section by welding several panels molded in a predetermined shape.

However, this method may be suitable for the vehicle body of a mass production vehicle type, but it is difficult to apply to the vehicle body of a small production vehicle type. The above method has a problem in that the mold cost and welding cost are burdened according to molding and assembling the panel, the manufacturing process is complicated, and the production cycle time is required.

Recently, a cell production method that is advantageous for producing a small amount of vehicle bodies of various vehicle types with a small number of parts, and a smart factory method that does not require a vehicle body line and a painting line are used to produce key members of the vehicle body.

In the above methods suitable for a vehicle body of small production vehicle types, closed cross-section vehicle body members are manufactured with standardized pipes or closed cross-section vehicle body members are manufactured through a roll forming process.

As a method of connecting the vehicle body members of the closed cross-section manufactured in this way, a method of applying a coupling structure to the outer surface of the vehicle body members (e.g., welding, adapter welding, bolting) is being researched.

However, the method of applying the coupling structure to the outer surface of the vehicle body members has difficulties in securing the same coupling quality of the vehicle body members and stable connection robustness of the vehicle body members.

Matters described in this background section are prepared to enhance understanding of the background of embodiments of the invention and may include matters other than conventional art already known to a person of an ordinary skill in the field to which this art belongs.

SUMMARY

The present invention relates to a vehicle body structure. Particular embodiments relate to a connection structure of a vehicle body in which vehicle body members having a closed cross-section are connected.

Embodiments of the present disclosure provide a body member connection structure that is suitable for the development of small-volume production vehicle bodies of many types of vehicles and can ensure the quality of coupling and stable connection strength of a plurality of body members having closed cross-sections.

A connection structure of a vehicle body according to an exemplary embodiment of the present invention may include a side member disposed along the front to rear direction of the vehicle body on an upper portion of side structures provided on both sides of the vehicle body and having a closed cross-section, a roof rail member disposed along the vehicle width direction to connect the side member and having a closed cross-section, and a joint member connected to the side member and the roof rail member to connect the side member and the roof rail member.

The connection structure of a vehicle body according to an exemplary embodiment may further include an engage unit that engages the side member, the roof rail member, and the joint member.

The side member may include a first connection portion and a second connection portion connected to the joint member.

The first connection portion may be formed by overlapping a panel in two layers on an upper portion of the side member.

The second connection portion may be formed by overlapping the panel in two layers at the lower portion of the side member with a closed section extending from the first connection portion in between.

The roof rail member may include a third connection portion and a fourth connection portion connected with the joint member.

The third connection portion may be formed by overlapping a panel in two layers at the front of the roof rail member.

The fourth connection portion may form a closed section extending from the third connection portion to the rear portion of the roof rail member.

The joint member may include a first joint portion engaged with the first connection portion and the second connection portion, a joint reinforcement extending from the first joint portion and having a closed cross-section, and a second joint portion extended from the joint reinforcement and engaged with the third connection portion and the fourth connection portion.

The joint reinforcement may include a closed section formed between the first joint portion and the second joint portion along the vehicle width direction.

The first joint portion may include a first upper rib engaged with the first connection portion and a first lower rib that extends downward from the first upper rib and engages a side surface of the second connection portion.

The second joint portion may include a second upper rib that extends from the upper portion of the joint reinforcement and engages the third connection portion, a third upper rib that extends from the upper portion of the joint reinforcement and the second upper rib and engages the upper portion of the fourth connection portion, and a second lower rib that extends from the lower portion of the joint reinforcement and engages the lower portion of the fourth connection portion.

A first opening may be formed between the joint reinforcement and the third upper rib.

A second opening may be formed between the joint reinforcement and the second lower rib.

The engage unit may include a rivet and a screw.

The side member and the roof rail member may be formed of a steel material.

The joint member may be formed of aluminum material.

According to the exemplary embodiments of the present invention, the overall number of parts of the vehicle body can be reduced to be suitable for the development of a vehicle body for small-scale production of multiple types of vehicles, and the same combination quality of vehicle body members and stable connection robustness of vehicle body members can be obtained.

In addition, the effects that can be obtained or predicted due to the embodiments of the present invention will be directly or implicitly disclosed in the detailed description of the embodiments of the present invention. That is, various effects expected according to an exemplary embodiment of the present invention will be disclosed within the detailed description to be described later.

BRIEF DESCRIPTION OF THE DRAWINGS

Since these drawings are for reference in explaining exemplary embodiments of the present invention, the technical idea of embodiments of the present invention should not be construed as limited to the accompanying drawings.

Figure 1:
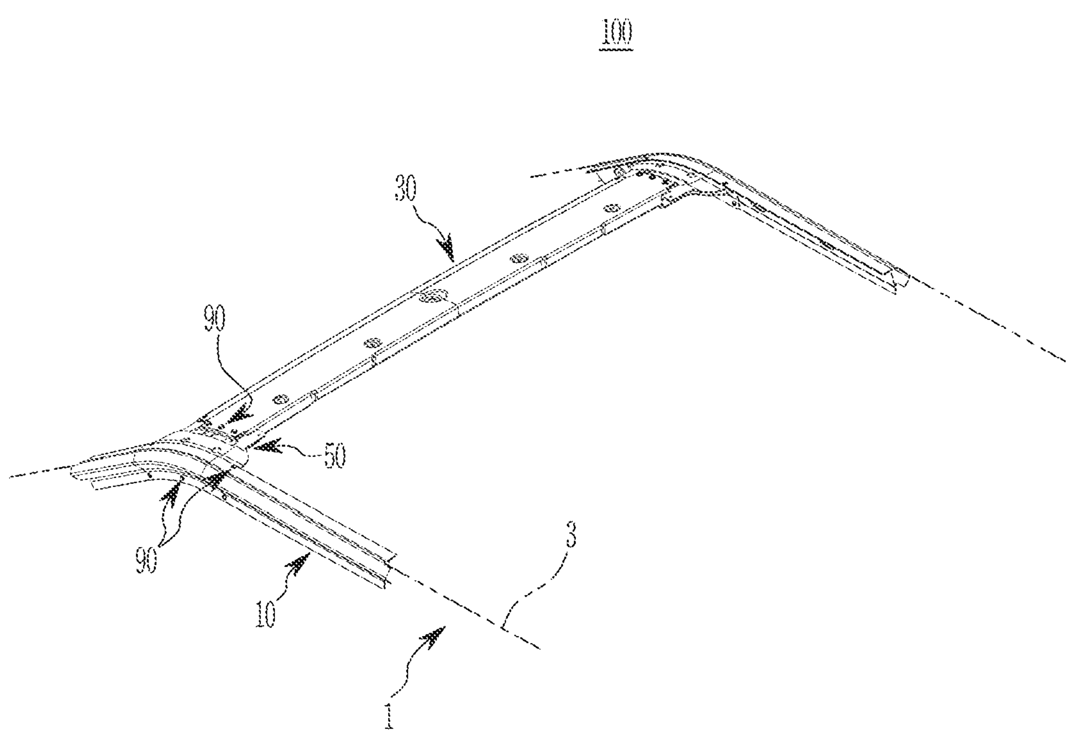
FIG. 1 is a partial perspective view of a vehicle body applied to a connection structure of a vehicle body according to an exemplary embodiment.

The following reference identifiers may be used in connection with the drawings to describe various features of embodiments of the present invention.

| | |
|---|---|
| 1: | vehicle body |
| 3: | side structure |
| 10: | side member |
| 11, 31, 57: | closed cross-section |
| 13: | first closed section |
| 21: | first connection portion |
| 23: | second connection portion |
| 30: | roof rail member |
| 33: | second closed section |
| 41: | third connection portion |
| 43: | fourth connection portion |
| 50: | joint member |
| 51: | first joint portion |
| 53: | joint reinforcement |
| 55: | second joint portion |
| 59: | third closed section |
| 61: | first upper rib |
| 63: | first lower rib |
| 65: | second upper rib |
| 67: | third upper rib |
| 69: | second lower rib |
| 71: | first opening |
| 73: | second opening |

-continued

| | |
|---|---|
| 90: | engage unit |
| 91: | rivet |
| 93: | screw |
| 100: | connection structure of a vehicle body |

The drawings referenced above are not necessarily drawn to scale, but should be understood as presenting rather simplified representations of various preferred features illustrating the basic principles of embodiments of the present invention. For example, specific design features of embodiments of the present invention, including specific dimensions, direction, position, and shape, will be determined in part by specific intended applications and use environments.

DETAILED DESCRIPTION OF ILLUSTRATIVE EMBODIMENTS

Embodiments of the present invention will be described more fully hereinafter with reference to the accompanying drawings, in which exemplary embodiments of the invention are shown. As those skilled in the art would realize, the described embodiments may be modified in various different ways, all without departing from the spirit or scope of the present invention.

The terminology used herein is for the purpose of describing specific exemplary embodiments only and is not intended to limit the present disclosure. As used herein, the singular forms are intended to include the plural forms as well, unless the context clearly indicates otherwise.

The terms 'comprises' and/or 'comprising' as used herein indicate the presence of specified features, integers, steps, operations, elements and/or components, but it should also be understood that they do not exclude the presence or addition of one or more other features, integers, steps, operations, components, and/or groups thereof.

As used in this specification, the term 'and/or' includes any one or all combinations of at least one of the associated listed items.

In this specification, the term 'connected' indicates a physical relationship between two components, for example, in which components are directly connected to each other by welding, self piercing rivet (SPR), flow drill screw (FDS), structural adhesive, or the like, or in which components are indirectly connected through one or more intermediate components.

As used herein, 'vehicle', 'vehicular', 'automotive' or other similar terms as used herein generally refer to passenger vehicles, sports cars, sport utility vehicles (SUVs), buses, trucks, and various commercial vehicles including passenger automobiles, hybrid vehicles, electric vehicles, hybrid electric vehicles, electric vehicle-based PBVs (Purpose Built Vehicles), hydrogen-powered vehicles and other alternative fuel vehicles (e.g., other than petroleum fuel derived from resources).

Hereinafter, embodiments of the present invention will be described in detail with reference to the accompanying drawings.

FIG. 1 is a partial perspective view of a vehicle body applied to a connection structure of a vehicle body according to an exemplary embodiment.

Referring to FIG. 1, the connection structure 100 of a vehicle body according to an exemplary embodiment may be applied to, for example, a vehicle body 1 of a purpose-based mobility vehicle (hereinafter referred to as a 'PBV').

In one example, the PBV may be used as an electric vehicle based life module vehicle that provides various services to users while moving from a starting point to a destination in an unmanned autonomous driving method. The life module vehicle described above is also referred to by a person of an ordinary skill in the art as a 'robo taxi', a 'robo shuttle' or a 'hailing vehicle'.

Such a PBV may be manufactured in a one box design with a large interior space. In addition, the PBV may be applied with a facing type seat to provide a wide interior space.

The vehicle body 1 of the PBV includes a skateboard type under body (not shown) (commonly referred to as a 'rolling chassis' or 'chassis frame' by those skilled in the art) and an upper body assembled to the under body.

The under body may be equipped with a battery assembly and a drive motor. And, the upper body is a BIW (Body-In-White) body coupled to the under body and may constitute a cabin with a wide indoor space.

In this specification, 'upper end', 'upper portion', or 'upper surface' of a component indicates an end, portion, or surface of a component that is relatively upper in the drawing, and 'lower end', 'lower portion', or 'lower surface' of a component indicates an end, portion, or surface of a component that is relatively lower in the drawing.

In this specification, an end of a component (e.g., one end or another (other) end, etc.) denotes an end of a component in any one direction, and an end portion of the component (e.g., one end portion) or other (another) end portion, etc.) denotes a portion of a component that includes that end.

The connection structure 100 according to an exemplary embodiment may be applied to the upper body of the vehicle body 1 as described above. The vehicle body 1 may be provided with a plurality of vehicle body members assembled together along a vehicle width direction, a front to rear direction of the vehicle body, and a vertical direction of the vehicle body.

The vehicle body 1 includes side structures 3 provided on both sides along the vehicle width direction. The side structure 3 is disposed along the front to rear direction of the vehicle body. The connection structure 100 according to an exemplary embodiment may be applied to the side structure 3 and a roof structure connected to an upper portion of the side structure 3.

The connection structure 100 according to an exemplary embodiment is suitable for the development of a vehicle body for small-scale production of multiple types of vehicles, and it is possible to secure the combined quality and stable connection robustness of a plurality of vehicle body members having a closed cross-section.

Figure 2:
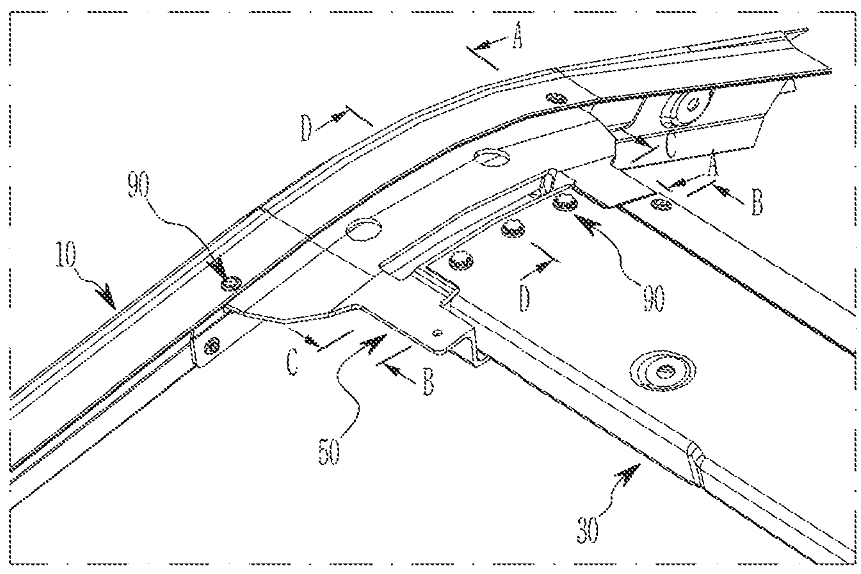
FIG. 2 and FIG. 3 are perspective views illustrating a connection structure of a vehicle body according to an exemplary embodiment.
Figure 3:
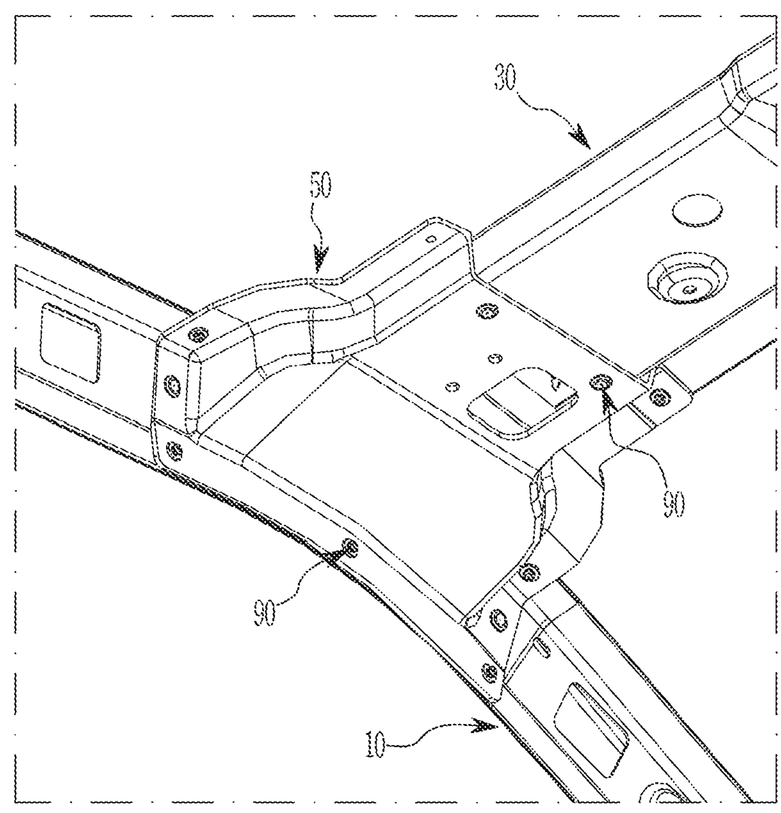
Figure 4:
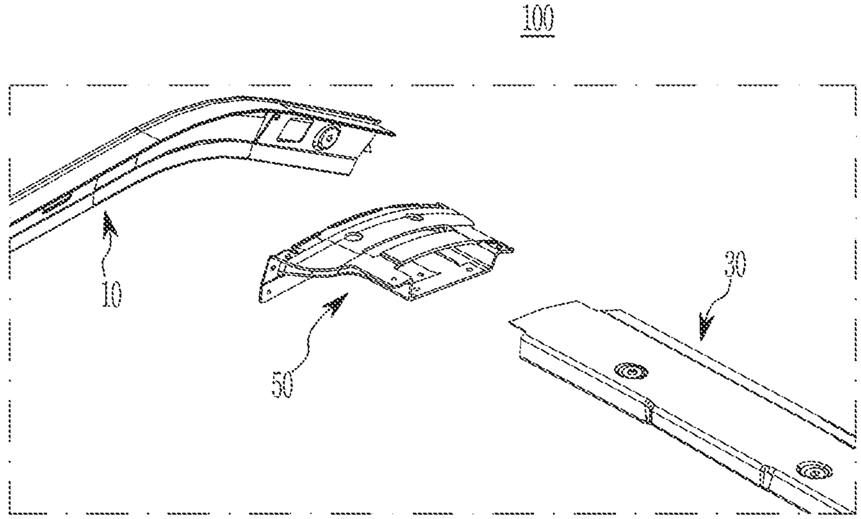
FIG. 4 is an exploded perspective view showing a connection structure of a vehicle body according to an exemplary embodiment.

FIG. 2 and FIG. 3 are perspective views illustrating a connection structure of a vehicle body according to an exemplary embodiment, and FIG. 4 is an exploded perspective view showing a connection structure of a vehicle body according to an exemplary embodiment.

Referring to FIG. 1 to FIG. 4, the connection structure 100 according to an exemplary embodiment includes at least one side member 10, at least one roof rail member 30, a plurality of joint members 50, and an engage unit 90.

In an exemplary embodiment, the side member 10 is disposed on an upper portion of a side structure 3 along the front to rear direction of the vehicle body.

In one example, the side member 10 may be a front pillar upper reinforcement member of the side structure 3. In another example, the side member 10 may be a roof side upper reinforcement member and/or a rear pillar upper reinforcement member of the side structure 3.

Figure 5:
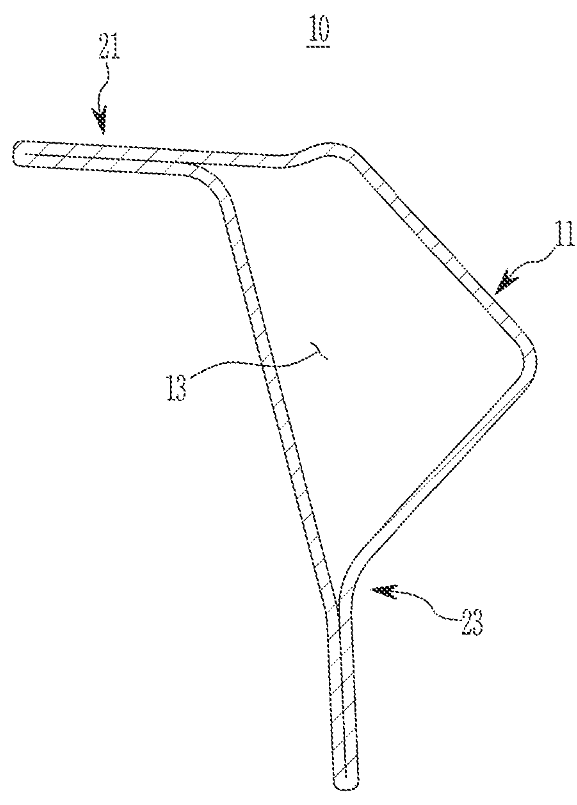
FIG. 5 is a cross-sectional view showing a side member applied to a connection structure of a vehicle body according to an exemplary embodiment.

As shown in FIG. 5, the side member 10 is formed with a closed cross-section 11. That is, the side member 10 includes a first closed section 13 formed along the front to rear direction of the vehicle body.

The side member 10 may be formed of a steel material. And, the side member 10 may be manufactured as a standardized pipe or through a roll forming process.

The side member 10 includes a first connection portion 21 and a second connection portion 23 connected with joint members 50 to be described later.

The first connection portion 21 may be formed by overlapping a panel in two layers on an upper portion of the side member 10. The second connection portion 23 may be formed by overlapping a panel in two layers at a lower portion of the side member 10 with the first closed section 13 extending from the first connection portion 21 interposed therebetween.

Referring to FIG. 1 to FIG. 4, in an exemplary embodiment, the roof rail member 30 is connected to an upper portion of the side structure 3 to form a roof structure body. The roof rail member 30 is configured to connect the side members 10 along the vehicle width direction.

The roof rail member 30 is disposed along the vehicle width direction. In one example, the roof rail member 30 may be a front roof rail member that connects the front pillar upper reinforcement member of the side structure 3 along the vehicle width direction. In another example, the roof rail member 30 may be a center roof rail member and/or a rear roof rail member that connects the roof side upper reinforcement member and/or the rear pillar upper reinforcement member of the side structure 3 along the vehicle width direction.

Figure 6:
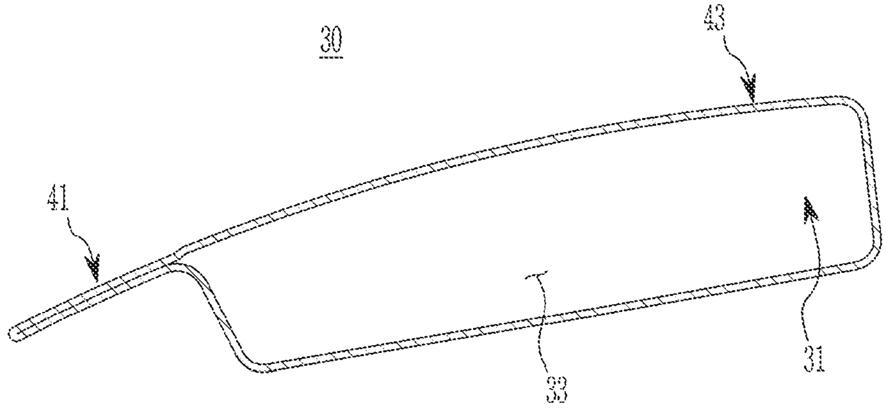
FIG. 6 is a cross-sectional view showing a roof rail member applied to a connection structure of a vehicle body according to an exemplary embodiment.

As shown in FIG. 6, the roof rail member 30 is formed with a closed cross-section 31. The roof rail member 30 includes a second closed section 33 formed along the vehicle width direction.

The roof rail member 30 may be formed of a steel material. The roof rail member 30 may be made of a standardized pipe or through a roll forming process.

The roof rail member 30 includes a third connection portion 41 and a fourth connection portion 43 combined with the joint members 50 to be described later.

The third connection portion 41 may be formed by overlapping a panel in two layers at a front of the roof rail member 30. The fourth connection portion 43 forms the aforementioned second closed section 33 extending from the third connection portion 41 to the rear portion of the roof rail member 30.

In the following, referring to FIG. 1 to FIG. 4 and FIG. 7 to FIG. 13, the configuration of the plurality of joint members 50 according to an exemplary embodiment and the connection structure of the side member 10 and the roof rail member 30 by the plurality of joint members 50 will be described in detail.

Referring to FIG. 1 to FIG. 4, in an exemplary embodiment, the plurality of joint members 50 are configured to connect the side member 10 and the roof rail member 30 along the vehicle width direction.

The plurality of joint members 50 may be connected to the side member 10 and the roof rail member 30. The plurality of joint members 50 may be formed of aluminum material. In one example, the plurality of joint members 50 may be made of extruded aluminum or cast aluminum.

Each of the joint members 50 as shown in FIG. 7 to FIG. 10 may include a first joint portion 51, a joint reinforcement 53, and a second joint portion 55.

Figure 7:
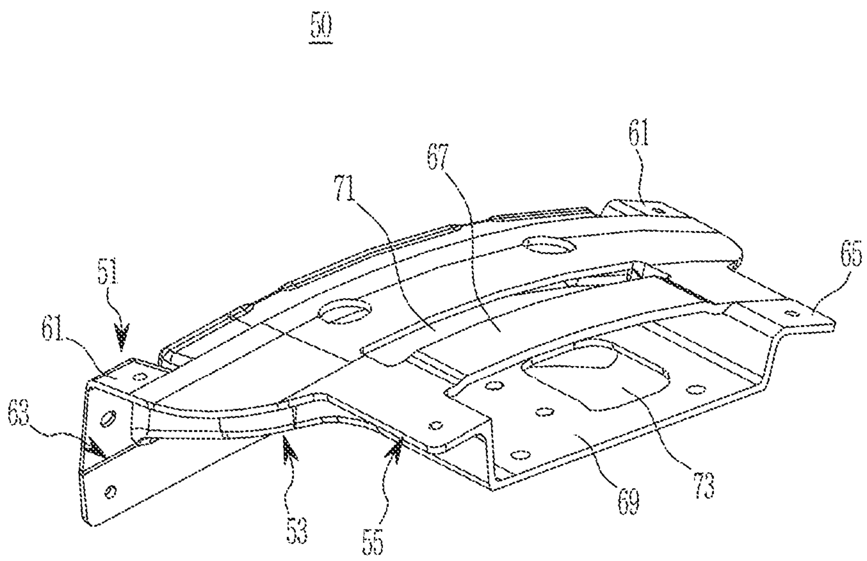
FIG. 7 to FIG. 10 are drawings showing a joint member applied to a connection structure of a vehicle body according to an exemplary embodiment.
Figure 8:
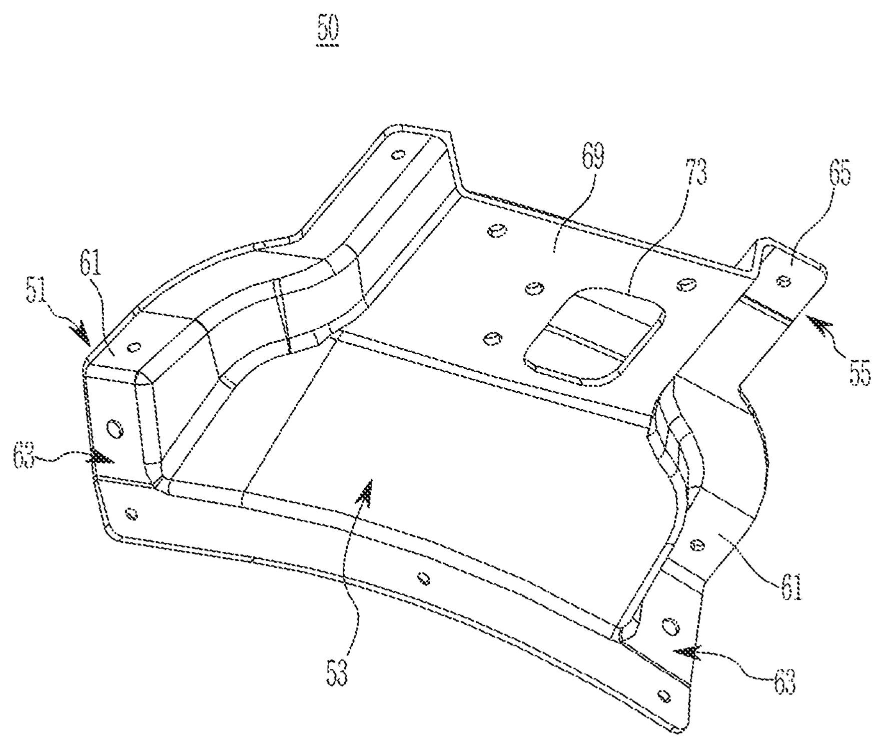
Figure 9:
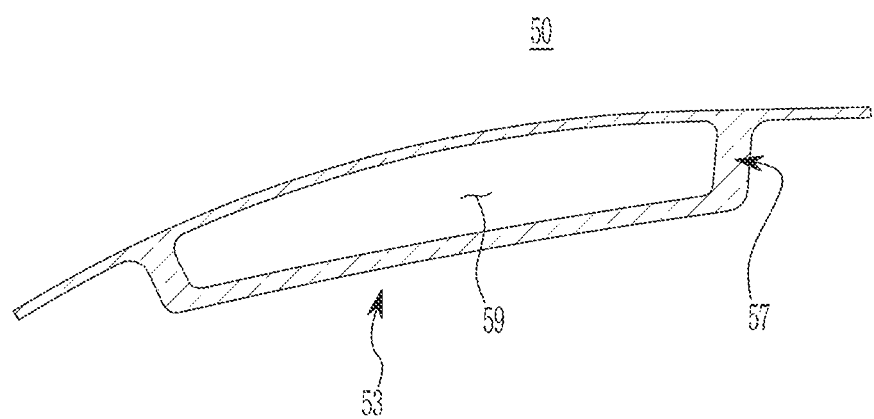
Figure 10:
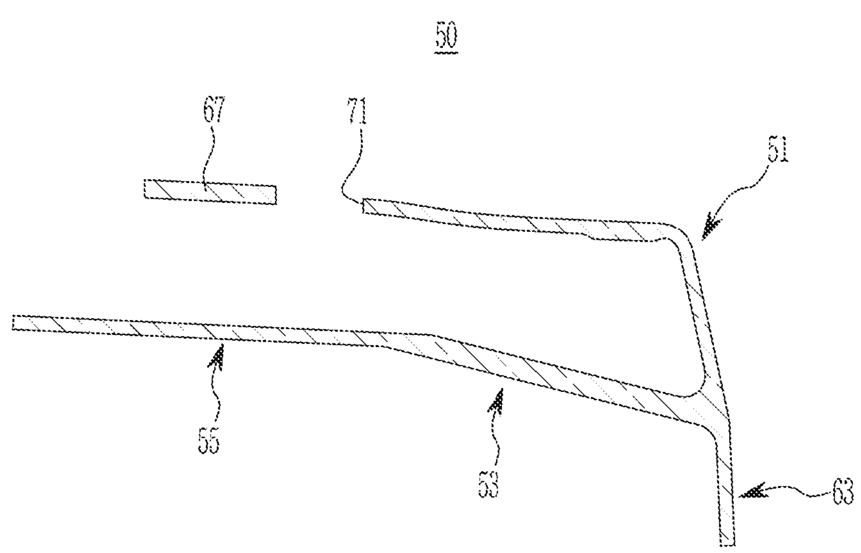
Figure 11:
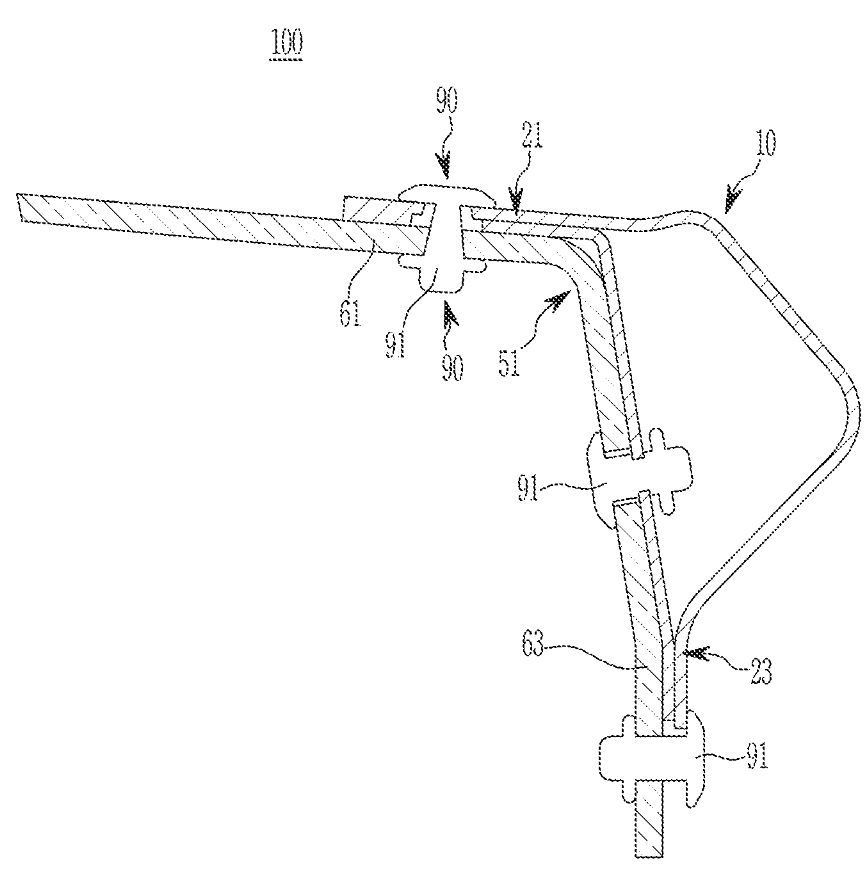
FIG. 11 is a cross-sectional view along line A-A in FIG. 2.

The first joint portion 51 as shown in FIG. 11, as a portion corresponding to the side member 10, may be formed on one side portion of the joint member 50 (hereinafter, see FIG. 7 and FIG. 8). The first joint portion 51 may be engaged with the side member 10.

The first joint portion 51 may be engaged with the first connection portion 21 and the second connection portion 23 of the side member 10. The first joint portion 51 includes a first upper rib 61 and a first lower rib 63.

The first upper rib 61 is formed on both sides along the front to rear direction of the vehicle body on each upper surface of the joint members 50. The first upper rib 61 may be engaged with the first connection portion 21 of the side member 10.

The first lower rib 63 extends downward from the first upper rib 61. The first lower rib 63 may be engaged with a side surface of the second connection portion 23 of the side member 10.

The joint reinforcement 53 is configured for reinforcing the strength of the joint members 50. The joint reinforcement 53 extends from the first joint portion 51 along the vehicle width direction.

The joint reinforcement 53 is formed as a closed cross-section 57. The joint reinforcement 53 includes a third closed section 59 formed along the vehicle width direction. The third closed section 59 may be formed between the first joint portion 51 and the second joint portion 55 to be described later.

Figure 12A:
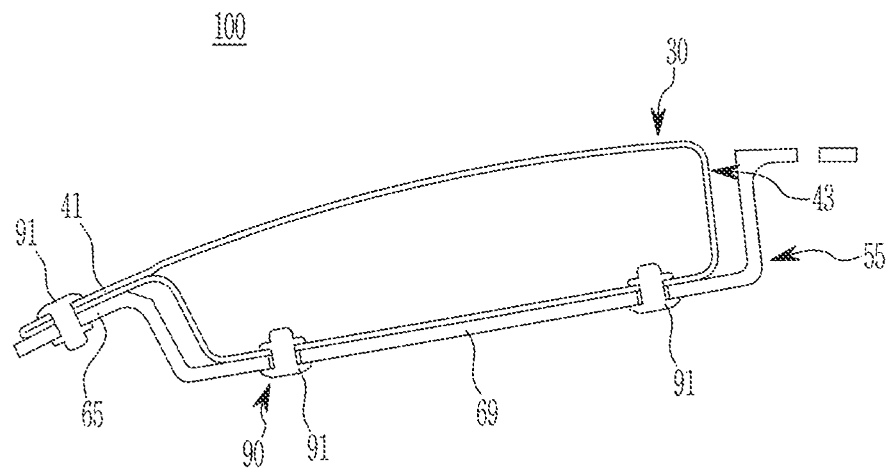
FIG. 12A and FIG. 12B are cross-sectional views along line B-B and line C-C in FIG. 2.
Figure 12B:
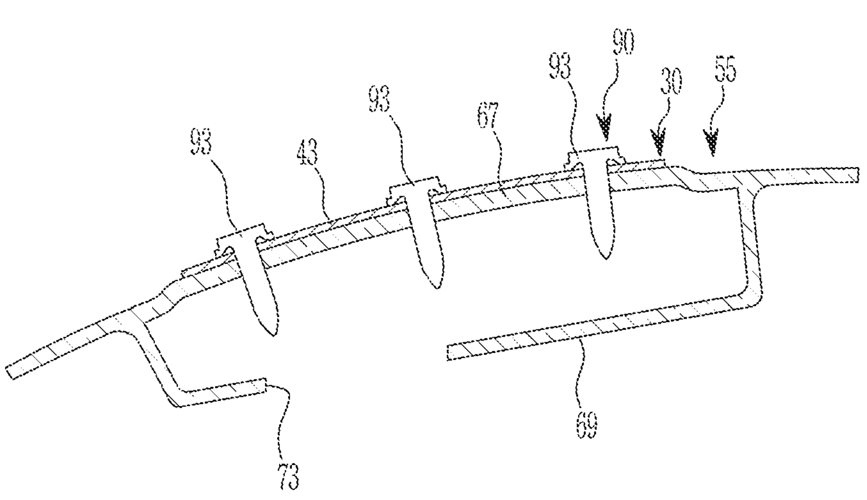

As shown in FIG. 12, the second joint portion 55 is a portion corresponding to the roof rail member 30 and may be formed on the other side portion of each of the joint members 50.

The second joint portion 55 may be engaged with the roof rail member 30. The second joint portion 55 extends along the vehicle width direction at the joint reinforcement 53.

The second joint portion 55 may be engaged with the third connection portion 41 and the fourth connection portion 43 of the roof rail member 30. This second joint portion 55 includes a second upper rib 65, a third upper rib 67, and a second lower rib 69.

The second upper rib 65 extends from the upper portion of the joint reinforcement 53 and may be engaged with the third connection portion 41 of the roof rail member 30.

The third upper rib 67 may extend from the upper portion of the joint reinforcement 53 and the second upper rib 65 and may be engaged with an upper portion of the fourth connection portion 43 of the roof rail member 30.

The second lower rib 69 may extend from the lower portion of the joint reinforcement 53 and be engaged with the lower portion of the fourth connection portion 43.

In each of the joint members 50 as described above, a first opening 71 is formed between the joint reinforcement 53 and the third upper rib 67 along the vehicle width direction. A second opening 73 is formed between the joint reinforcement 53 and the second lower rib 69 along the vehicle width direction.

These first openings 71 and second openings 73 may be formed for material reduction of each of the joint members 50 in a range that does not deteriorate the predetermined strength of each of the joint members 50.

Referring to FIG. 1 to FIG. 4, FIG. 11, and FIG. 12, in an exemplary embodiment, the engage unit 90 is configured to engage the side member 10, the roof rail member 30, and the joint members 50.

The engage unit 90 includes a plurality of rivets 91 and a plurality of screws 93.

Hereinafter, the assembly process and operation of the connection structure 100 according to an exemplary embodiment are explained in detail referring to FIG. 1 to FIG. 13.

The side member 10 having the closed cross-section 11 and manufactured by a roll forming process of a steel material plate is provided. The roof rail member 30 having the closed cross-section 31 and manufactured by a roll forming process of a steel material plate is provided.

The joint members 50 manufactured by an aluminum material extrusion process or casting process are provided. The joint members 50 include the first joint portion 51, the joint reinforcement 53, and the second joint portion 55 integrally formed.

The side member 10 disposed along the front to rear direction of the vehicle body and the roof rail member 30 disposed along the vehicle width direction are engaged by the joint members 50.

The first connection portion 21 of the side member 10 and the first upper rib 61 of the first joint portion 51 may be engaged by a plurality of rivets 91.

The first connection portion 21 is formed by overlapping the panel in two layers, so that coupling through the rivet 91 may be strong.

The side surface of the second connection portion 23 of the side member 10 and the first lower rib 63 of the first joint portion 51 may be fastened by a plurality of rivets 91.

The second connection portion 23 is formed by overlapping the panel in two layers, so that coupling through the rivet 91 may be strong.

The third connection portion 41 of the roof rail member 30 and the second upper rib 65 of the second joint portion 55 may be engaged by a plurality of rivets 91.

The third connection portion 41 is formed by overlapping the panel in two layers, so that coupling through the rivet 91 may be strong.

The upper portion of the fourth connection portion 43 of the roof rail member 30 and the third upper rib 67 of the second joint portion 55 may be fastened by a plurality of screws 93.

The lower portion of the fourth connection portion 43 of the roof rail member 30 and the second lower rib 69 of the second joint portion 55 may be fastened by a plurality of screws 93.

According to the connection structure 100 according to an exemplary embodiment, the side member 10 and the roof rail member 30 having closed cross-sections 11 and 31 may be engaged by the joint members 50.

Figure 13:
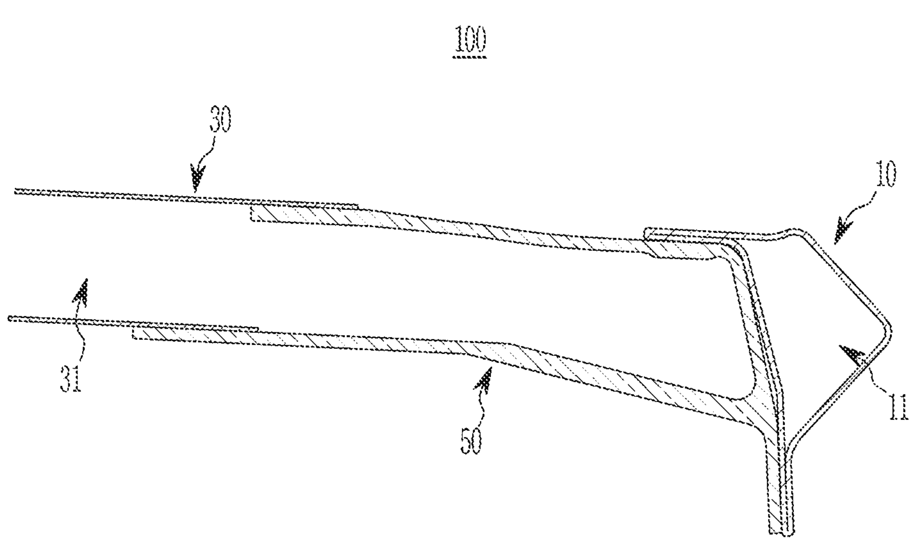
FIG. 13 is a cross-sectional view along line D-D in FIG. 2.

Furthermore, according to the connection structure 100 according to an exemplary embodiment, as shown in FIG. 13, the upper and lower portions of the side member 10 having the closed cross-section 11 and the upper and lower portions of the roof rail member 30 having the closed cross-section 31 may be connected by the joint members 50.

Accordingly, the connection structure 100 according to an exemplary embodiment reinforces the upper structure of the vehicle body 1 and can secure excellent roof strength performance.

As described so far, the connection structure 100 according to an exemplary embodiment can reduce the overall number of parts of the vehicle body 1 to be suitable for the development of a small-scale production vehicle body of multiple types of vehicles.

In addition, the connection structure 100 according to an exemplary embodiment may secure the same coupling quality of vehicle body members having a closed cross-section and stable connection robustness (e.g., roof crush performance) of vehicle body members.

While embodiments of this invention have been described in connection with what is presently considered to be practical exemplary embodiments, it is to be understood that the embodiments of the invention are not limited to the disclosed embodiments. On the contrary, they are intended to cover various modifications and equivalent arrangements included within the spirit and scope of the appended claims.

What is claimed is:

1. A connection structure of a vehicle body, the connection structure comprising:

a side member disposed along a front to rear direction of the vehicle body on an upper portion of a side structure provided on a side of the vehicle body, the side member having a first closed cross-section and comprising a first connection portion and a second connection portion;

a roof rail member disposed along a vehicle width direction and having a second closed cross-section; and a joint member connected to the side member and the roof rail member to connect the side member and the roof rail member to each other, wherein the joint member is connected to each of the first connection portion and the second connection portion of the side member, wherein the first connection portion is arranged by overlapping a panel in two layers on an upper portion of the side member, and the second connection portion is arranged by overlapping the panel in two layers at a lower portion of the side member.

2. The connection structure of claim 1, wherein:

a closed section extends between the first connection portion and the second connection portion.

3. The connection structure of claim 1, wherein the roof rail member comprises a third connection portion and a fourth connection portion connected with the joint member.

4. The connection structure of claim 3, wherein:

the third connection portion is arranged by overlapping a panel in two layers at a front of the roof rail member; and the fourth connection portion defines a closed section extending from the third connection portion to a rear portion of the roof rail member.

5. The connection structure of claim 3, wherein the joint member comprises:

a first joint portion engaged with the first connection portion and the second connection portion;

a joint reinforcement extending from the first joint portion and having a third closed cross-section; and a second joint portion extending from the joint reinforcement and engaged with the third connection portion and the fourth connection portion.

6. The connection structure of claim 5, wherein the joint reinforcement comprises a closed section defined between the first joint portion and the second joint portion along the vehicle width direction.

7. The connection structure of claim 5, wherein the first joint portion comprises:

a first upper rib engaged with the first connection portion; and a first lower rib extending downward from the first upper rib and engaged with a side surface of the second connection portion.

8. The connection structure of claim 5, wherein the second joint portion comprises:

a second upper rib extending from an upper portion of the joint reinforcement and engaged with the third connection portion;

a third upper rib extending from the upper portion of the joint reinforcement and the second upper rib and engaged with an upper portion of the fourth connection portion; and a second lower rib extending from a lower portion of the joint reinforcement and engaged with a lower portion of the fourth connection portion.

9. The connection structure of claim 8, wherein:

a first opening is defined between the joint reinforcement and the third upper rib; and a second opening is defined between the joint reinforcement and the second lower rib.

10. The connection structure of claim 1, wherein the side member, the roof rail member, and the joint member are coupled to each other by a plurality of rivets and a plurality of screws.

11. A vehicle comprising:

a vehicle body;

first and second side structures provided on both sides of the vehicle body, respectively, and extending in a vehicle length direction;

first and second side members disposed along a front to rear direction of the vehicle body on upper portions of the first and second side structures, respectively, wherein each of the first and second side members has a first closed cross-section, and wherein each of the first and second side members comprises a first connection portion and a second connection portion;

a roof rail member disposed along a vehicle width direction and having a second closed cross-section; and a first joint member connecting the first side member to a first end of the roof rail member and a second joint member connecting the second side member to a second end of the roof rail member, wherein the first joint member is connected to the first connection portion and the second connection portion of the first side member and the second joint member is connected to the first connection portion and the second connection portion of the second side member, wherein the first connection portion of the first side member is arranged by overlapping a first panel in two layers on an upper portion of the first side member, and the second connection portion of the first side member is arranged by overlapping the first panel in two layers at a lower portion of the first side member.

12. The vehicle of claim 11, wherein a first closed section extends between the first connection portion and the second connection portion of the first side member.

13. The vehicle of claim 11, wherein the roof rail member comprises a third connection portion and a fourth connection portion connected with the first joint member.

14. The vehicle of claim 13, wherein the first joint member comprises:

a first joint portion engaged with the first connection portion and the second connection portion;

a joint reinforcement extending from the first joint portion and having a third closed cross-section; and a second joint portion extending from the joint reinforcement and engaged with the third connection portion and the fourth connection portion.

15. The vehicle of claim 14, wherein the joint reinforcement comprises a third closed section defined between the first joint portion and the second joint portion along the vehicle width direction.

16. The vehicle of claim 14, wherein:

the first joint portion comprises:

a first upper rib engaged with the first connection portion; and a first lower rib extending downward from the first upper rib and engaged with a side surface of the second connection portion.

17. The vehicle of claim 16, wherein the second joint portion comprises:

a second upper rib extending from an upper portion of the joint reinforcement and engaged with the third connection portion;

a third upper rib extending from the upper portion of the joint reinforcement and the second upper rib and engaged with an upper portion of the fourth connection portion; and a second lower rib extending from a lower portion of the joint reinforcement and engaged with a lower portion of the fourth connection portion.

18. The vehicle of claim 17, wherein:

a first opening is defined between the joint reinforcement and the third upper rib; and a second opening is defined between the joint reinforcement and the second lower rib.

19. The vehicle of claim 13, wherein:

the third connection portion is arranged by overlapping a second panel in two layers at a front of the roof rail member; and the fourth connection portion defines a second closed section extending from the third connection portion to a rear portion of the roof rail member.

20. A connection structure of a vehicle body, the connection structure comprising:

a side member disposed along a front to rear direction of the vehicle body on an upper portion of a side structure provided on a side of the vehicle body, the side member having a first closed cross-section and comprising a first connection portion and a second connection portion;

a roof rail member disposed along a vehicle width direction and having a second closed cross-section; and a joint member connected to the side member and the roof rail member to connect the side member and the roof rail member to each other, wherein:

the joint member is connected to each of the first connection portion and the second connection portion of the side member, the first connection portion is arranged by overlapping a panel in two layers on an upper portion of the side member, the second connection portion is arranged by overlapping the panel in two layers at a lower portion of the side member, a closed section extends between the first connection portion and the second connection portion, and the joint member includes an engage unit configured to engage the side member and the roof rail member.

* * * * *